United States Patent Office 3,155,934
Patented Nov. 3, 1964

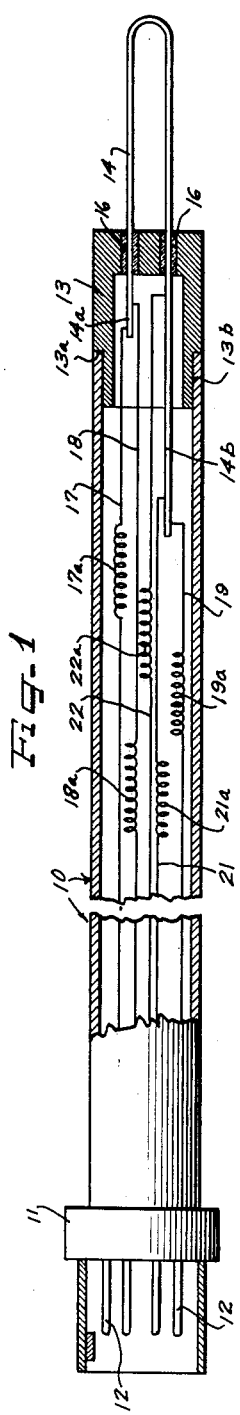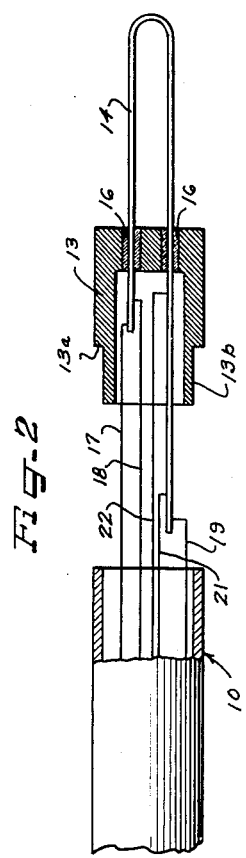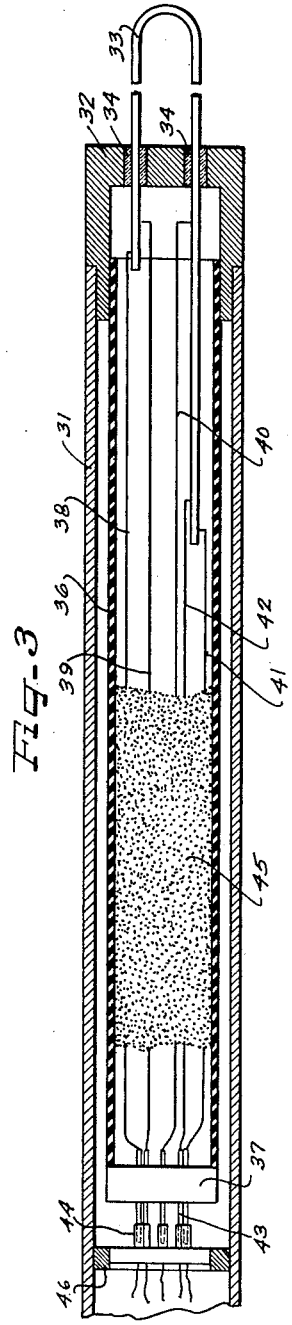

3,155,934
HERMETICALLY SEALED PROBE FOR MEASURING CORROSION
William E. Messick, Tustin, Edgar J. Goff, Fullerton, and Ted H. Cramer, Garden Grove, Calif., assignors to Magna Corporation, Santa Fe Springs, Calif., a corporation of California
Filed Mar. 8, 1962, Ser. No. 178,339
2 Claims. (Cl. 338—13)

The present invention relates to a hermetically sealed probe for measuring corrosion by the electrical resistance method. This method involves the use of a corrodible metal specimen in the environment whose corrosive tendencies are to be monitored. In such a system, the corroding element is normally made part of an electrical bridge circuit of the Wheatstone or Kelvin type. In order to compensate for temperature difference which could give an erroneous reading on the sensing instrument of the bridge circuit, there is provided a compensating element usually composed of the same material as the corroding element, but protected against corrosion. This reference element comprises another arm on the bridge circuit in which the corroding element is located. Since temperature changes affect both the corroding element and the reference element equally, the ratio of the resistances of the two elements, determined by the bridge circuit, is then an accurate measure of the progress of corrosion in the system.

A typical design for such corrosion measuring probes in the past involves the use of a replaceable corroding specimen consisting essentially of a wire loop cast into a supporting tube. In the past, the assembly of these inserts has been accomplished by running electrical leads through the insert body tube and then filling the void space between the tube and the leads with some type of potting compound. For use in temperatures below 400° F., epoxy resins have been extensively used. For temperatures above 500° F., ceramic-like materials such as Saureisen cement have been used to fill the void space. Many different materials have been tested for this application, and all have been found to have disadvantages under some conditions. For example, although epoxy resins are generally resistant to chemical attack at low to moderate temperatures, they are more and more rapidly attacked by many chemicals as the temperature of exposure is increased. Most ceramic-like potting compounds, on the other hand, are resistant to acid solutions but are rapidly attacked by alkaline solutions. Furthermore, the porosity of this type of potting compound permits the body of the probe to become saturated with fluids in a short period of time.

The problems of permeation arise because a small portion of the potting compound must be left exposed to the environment at the base of the measuring element loop. The rate of attack by chemical agents at the exposed end of the potting compound has been reduced considerably by the use of material such as polytetrafluoroethylene buttons which fit tightly around the measuring elements and inside the end of the insert body tubes. However, although this button acts as a diffusion barrier and slows down direct chemical attack, it does not prevent the migration of fluids in and out of the end of the tube due to changes in pressure and temperature. As a result, the electrical circuitry inside the insert body is often damaged by chemical attack.

With the foregoing in mind, an object of the present invention is to provide an improved corrosion measuring probe which provides a substantially completely impervious seal about the exposed corroding element.

Another object of the invention is to provide an improved corrosion measuring probe which eliminates the need for individual selection of potting compounds to suit various applications.

Another object of the invention is to provide a sealed type corrosion measuring probe which greatly reduces the possibility of any process fluids entering the inside body tube.

Another object of the invention is to provide a corrosion measuring probe assembly in which the number of elements in the replaceable portion of the assembly are kept to a minimum thereby making it more convenient and more economical to effect such replacement.

Other objects and features of the present invention will be apparent to those skilled in the art from the following description, taken with the accompanying drawings which form a part of this application.

In the drawings:

FIGURE 1 is a view in elevation and partly in cross section illustrating a form of corrosion measuring probe according to the present invention, completely assembled;

FIGURE 2 is a fragmentary view of the probe of FIGURE 1, illustrating the manner in which the corroding element can be removed and replaced when necessary; and FIGURE 3 is an axial cross-sectional view of a modified form of the present invention.

As shown in the drawings:

In FIGURE 1, reference numeral 10 indicates generally a main support tube composed of a corrosion resistant metal such as stainless steel or the like. At one end of the tube 10 there is provided a receptacle 11 containing outwardly extending prongs 12 for providing electrical continuity to the bridge circuit or other measuring device with which the corrosion measuring probe is to be used.

The opposite end of the tube 10 is closed by means of a cap 13 having an annular flange portion 13a abutting the end of the tube 10, and a reduced diameter shoulder portion 13b snugly received within the inner diameter of the tube 10, and preferably secured thereto by brazing or the like. The cap 13 may be made of an alloy resistant to corrosion such as stainless steel, or a nickel based alloy, a titanium based alloy, or the like.

The corroding element in the form of the invention shown takes the form of a wire loop 14, the bend of which is arranged to be exposed to the corrosive environment to be tested. The opposed legs of the loop 14 are received through the cap 13 by providing a pair of seals 16 composed of an impervious material such as glass which will prevent access by process fluids, and is resistant to corrosion. Thermosetting resins and similar chemical cements may be used at low temperatures, on the order of 400° F. or lower and in less severe environments, but their resistance to chemical attack is of a lower order of magnitude than that of glass. Ceramics are generally more chemically resistant, but tend to be porous and thus allow slow leakage. For this reason, we prefer to make the bushings 16 of glass, particularly a glass which has a softening point in the range from about 700 to 1500° F. The seals 16 can then be completely sealed to the wire loop 14 by means of glass-to-metal seals which can be made strong, non-porous, and highly resistant to chemical attack.

The free ends of the loop 14, identified as 14a and 14b are thus confined within the interior of the tube 10 and the cap 13. Electrical connections are made from the end 14a by means of conductors 17 and 18 which extend the length of the tube 10 and are electrically connected to the prongs 12 in the receptacle 11. One of the conductors 17 and 18 provides a current tap, and the other a potential tap for a Kelvin bridge circuit.

The other free end portion 14b is sufficiently long so that it provides a reference element whose ratio of resistance to the resistance of the exposed portion of the loop remains constant despite changes in temperature. The current and potential taps from the end of the free end portion 14b are provided by conductors 19 and 21, and a center tapping lead 22 is secured to the free end portion 14b to define the electrical midpoint (or a predetermined resistance ratio) between the resistances of the reference element and the corroding element.

Each of the conductors, 17, 18, 19, 21, and 22 has an extended length which permits the conductors to be withdrawn from the end of the assembly once the cap 13 is removed to facilitate replacement. This extensibility is provided by including loops 17a, 18a, 19a, 21a, and 22a along the lengths of the conductors within the body of the tube 10.

The assembly of the structure shown in FIGURE 1 is accomplished in the following manner. Prior to attachment of the conductors to the loop 14, the loop is pushed through holes provided in the cap 13, whereby the connections can be made to the conductors 17, 18, 19, 21, and 22. The loop 14 is then adjusted to its desired position, and the glass seals 16 are made between it and cap 13.

When it is desired to replace the corrosion element, the brazing between the cap 13 and the end of the tube 10 is softened, for example, by placing it in an induction heater, and the cap assembly is pulled out. The conductors are cut off just below the end of the legs 14a and 14b, and a new corroding element is attached to the leads extending outwardly beyond the tube 10, as illustrated in FIGURE 2 of the drawings. The cap 13 is then placed on the end of the tube 10, and a new brazed joint is made.

An improved version of a replaceable element assembly is shown in FIGURE 3 of the drawings. This type of corrosion measuring probe has an outer tube 31 provided with an end cap 32 substantially as in the device shown in FIGURE 1. A metal loop 33 which may be in the form of a wire, ribbon, or the like is secured in fixed position within the cap 33 by means of glass seals 34.

The device shown in FIGURE 3 includes an inner tube 36 composed of a rigid material such as a metal, a reinforced plastic, or glass. On one end of the tube 36 is arranged to be snugly received within the confines of the cap 32, while the other end is formed to take a plug 37. Electrical connectors 38, 39, 40, 41, and 42 are provided as in the previously described embodiment, and extend to pins 43 forming part of the receptacle 37. The pins 43 are arranged to mate with connectors 44 extending from a receptacle 46, closing the opposite end of the tube 31. If desired, the void space within the tube 36 (and this is true of the void space within the tube 10 of the structure in FIGURE 1) may be filled with and inert filler such as silica gel particles, identified at numeral 45, to provide some physical support to the conductors.

The device of FIGURE 3 is assembled by securing the cap 32 to the tube 31, and then the conductors 38 through 42 inclusive are attached to the pins 43 before fastening the plug 37 to the tube 36. The plug 37 is then cemented onto the end of the tube 36, completing the assembly. Then when it is desired to disassemble the assembly for replacement purposes, it is merely necessary to weaken the brazed joint between the tube 31 and the plug 32 and withdraw the pins 43 from engagement with the receptacle 44.

With the devices of the present invention, the interior of the support tubes are completely protected against process fluids and also against the corrosive environment. Furthermore, the type of replacement structure employed makes it simple and economical to replace only a minimum of parts when the corroding element is corroded beyond usefulness.

It should be evident that various modifications can be made to the described embodiments without parting from the scope of the present invention.

We claim as our invention:

1. A corrosion measuring probe comprising a hollow casing, an end cap detachably secured to one end of said casing, said end cap and said casing being fitted together to provide a flush joint at the union thereof, electrical connector means at the other end of said casing, a corrodible metal probe element carried by said end cap in exposed relation beyond said casing, seal means between said metal probe element and said end cap rigidly sealing the connection therebetween, a reference element constituting an extension of said probe and located within the confines of said casing, and electrical conductors connecting said probe and said reference element to said electrical connector means, said conductors being of sufficient length within said casing to permit detachment of said end cap and said probe element from said casing without disturbing the electrical connections at said electrical connector means.

2. The probe of claim 1 in which said end cap has an annular flange portion which abuts the end of said casing and a reduced diameter shoulder portion snugly received within the interior of said casing.

References Cited in the file of this patent

UNITED STATES PATENTS

| | | |
|---|---|---|
| 2,144,558 | Bahls | Jan. 17, 1939 |
| 2,260,689 | Miller | Oct. 28, 1941 |
| 2,587,674 | Aiken | Mar. 4, 1952 |
| 2,678,366 | Hebenstreit | May 11, 1954 |
| 2,864,925 | Ellison | Dec. 16, 1958 |
| 2,982,930 | Wygant | May 2, 1961 |
| 2,991,439 | Marsh et al. | July 4, 1961 |
| 2,993,366 | Birkness | July 25, 1961 |